(12) United States Patent
Aoki et al.

(10) Patent No.: US 7,734,830 B2
(45) Date of Patent: Jun. 8, 2010

(54) INFORMATION STORAGE DEVICE AND INFORMATION STORAGE METHOD

(75) Inventors: Kazuma Aoki, Aichi-ken (JP); Yuji Sato, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 818 days.

(21) Appl. No.: 11/216,038

(22) Filed: Sep. 1, 2005

(65) Prior Publication Data

US 2006/0044611 A1    Mar. 2, 2006

(30) Foreign Application Priority Data

Sep. 1, 2004    (JP)    ............... 2004-254572

(51) Int. Cl.
*G06F 3/00*    (2006.01)
(52) U.S. Cl. ............................. 710/1; 710/20
(58) Field of Classification Search .......... 710/1
See application file for complete search history.

(56) References Cited

U.S. PATENT DOCUMENTS

| | | | | |
|---|---|---|---|---|
| 6,057,930 | A * | 5/2000 | Blossey et al. | 358/1.15 |
| 7,130,068 | B1 * | 10/2006 | Ohta | 358/1.15 |
| 2003/0038971 | A1 * | 2/2003 | Renda | 358/1.16 |
| 2004/0193899 | A1 * | 9/2004 | Satake et al. | 713/190 |
| 2005/0187945 | A1 * | 8/2005 | Ehrich et al. | 707/100 |

FOREIGN PATENT DOCUMENTS

| | | |
|---|---|---|
| JP | 02-159673 | 6/1990 |
| JP | 11-007401 A | 1/1999 |
| JP | 11-195128 | 7/1999 |
| JP | 11-284820 | 10/1999 |
| JP | 11-289513 | 10/1999 |
| JP | 2000-322300 | 11/2000 |
| JP | 2001-256007 | 9/2001 |
| JP | 2003-016070 | 1/2003 |
| JP | 2003-283779 A | 10/2003 |

OTHER PUBLICATIONS

Notification of Reasons of Rejection received for Japanese Application No. 2004-254572 dated Oct. 14, 2008.
Notification of Reason of Rejection dispatched Jan. 20, 2009 in Japanese Application No. 2004-254572 and English translation thereof.

* cited by examiner

*Primary Examiner*—Henry W. H. Tsai
*Assistant Examiner*—John B Roche
(74) *Attorney, Agent, or Firm*—Banner & Witcoff, Ltd

(57) ABSTRACT

An information storage device, by which only information outputted in a state desired by a user can be stored and disclosed with minimum time and trouble of the user, is provided. After FAX transmission, the FAX image is displayed and an inquiry concerning whether to store the FAX image or not is conducted. When the user performs an operation designating registration of the FAX image in a database (i.e. when a registration command button is pressed by the user), the FAX image is registered in the database. When the user performs an operation designating discard of the FAX image (i.e. when a discard command button is pressed by the user), the FAX image is discarded. Since the user can decide whether or not to register the FAX image in the database after checking the image to be registered, registration of undesired image in the database can be prevented.

18 Claims, 11 Drawing Sheets

FIG.2A

FIELDS OF CONTENTS TABLE

| | |
|---|---|
| CONTENTS ID | 51a |
| RECORD STATUS | 51b |
| DATE/TIME | 51c |
| USER | 51d |
| INPUT SOURCE | 51e |
| SECURITY ATTRIBUTE | 51f |
| ELECTRONIC WATERMARK INFORMATION | 51g |
| FUNCTION TYPE | 51h |
| FUNCTION – SPECIFIC ATTRIBUTE | 51i |
| DATA ID | 51j |

FIG.2B

FIELDS OF DATA TABLE

| | |
|---|---|
| DATA ID | 53a |
| REFERENCE NUMBER | 53b |
| DATA FORMAT | 53c |
| DATA SIZE | 53d |
| ACTUAL DATA | 53e |

RESERVED DATA LIST

23 PIECES OF RESERVED DATA — 142

| DOCUMENT NO. | DATE/TIME | DOCUMENT TYPE | DOCUMENT INFORMATION |
|---|---|---|---|
| 001234 | 2004/06/08 13:29 | PRINT | NEW PRODUCT PROPOSAL |
| 001056 | 2004/01/23 09:34 | PC-FAX TX | NEW PRODUCT PROPOSAL |
| 003412 | 2004/10/19 15:45 | COPY | |
| 005432 | 2004/11/02 10:01 | MAIL | RE NEW PRODUCT PROPOSAL |
| 000014 | 2003/11/18 18:24 | PRINT | NEW PRODUCT PROPOSAL(DRAFT) |
| 000123 | 2003/12/15 19:19 | FAX RX | 2004/10/10/ 11:22 JAPAN TRADING CORPORATION |

141

DELETION — 143    CHECK — 144    END — 145

INFORMATION STORAGE DEVICE AND INFORMATION STORAGE METHOD

INCORPORATION BY REFERENCE

This application claims priority from Japanese Patent Application No. 2004254572, filed on Sep. 1, 2004, the entire subject matter of the application is incorporated herein by reference thereto.

BACKGROUND OF THE INVENTION

Aspects of the present invention relates to an information storage device having a storage function for storing inputted information and outputting the stored information afterward, such as an MFP (Multi Function Peripheral) having a plurality of input units for inputting information to the device and output units for outputting the information.

MFPs (Multi Function Peripherals), capable of automatically creating, presenting and publishing a Web page of a document (for example, as the object of processing, including diagrams, tables, etc.) in response to simple and easy operations by a user (like those for printing, copying, etc.), have recently been known, as described in Japanese Patent Provisional Publication No. HEI 11-195128 (as shown the second embodiment of the Publication). The MFP converts documents described in page description languages (PDLs) such as PostScript, images read by a scanner, etc. into HTML files, JPEG files, etc. and stores the files on a hard disk. In response to a browsing request from a personal computer on a network, the HTML files, JPEG files, etc., which have been stored on the hard disk are transmitted to the requesting personal computer via the network according to the request.

With such an MFP, Web pages are automatically created when the user lets the MFP execute printing, copying, etc. without the need of performing complicated operation. The created Web pages are then viewable from personal computers on the network, and the pages are easily handled.

However, in the MFP described in the above patent document, the user has to decide ahead of time whether to let the machine perform printing or copying or to let the machine store the document (the object of processing) on the hard disk in the form of Web pages, and give an instruction to the MFP according to the decision. Thus, in cases where the user has already instructed the MFP to store documents (objects of processing) on the hard disk as Web pages, even when a print output or copy output desired by the user is not obtained (e.g. when the object of printing is not fit in the print medium (paper, etc.), when characters printed out are faint and patchy and can not be read, when a figure or diagram is unclear, etc.), the document as the object of processing is stored on the hard disk as Web pages in the undesired state. In this case, the user does not recognize the undesired state of the document (stored on the hard disk as Web pages) until he/she checks the Web pages, by which the document in the form of the Web pages in the undesired state are repeatedly disclosed until the user notices the state. After noticing the undesired state, the user then needs to delete the undesired Web pages from the hard disk, which can be difficult for some users or annoying to others.

The problems described above are involved not only in the MFP of the above patent document but also in any information storage device having a storage function for storing inputted information and outputting the stored information afterward (such as MFPs having a plurality of input units and output units).

SUMMARY

Aspects of the present invention, which has been made in consideration of at least one of the above problems, are advantageous in that an information storage device, by which only information outputted in a state desired by the user can be stored and disclosed with minimum time and trouble of the user, is described.

BRIEF DESCRIPTION OF THE ACCOMPANYING DRAWINGS

FIG. 2A is a schematic diagram explaining each field of a contents table in accordance with aspects of the present invention.

FIG. 2B is a schematic diagram explaining each field of a data table in accordance with aspects of the present invention.

FIG. 11 is a schematic diagram showing an example of a reserved data list screen in accordance with aspects of the present invention.

DETAILED DESCRIPTION

General Overview of the Invention

Figure 1:
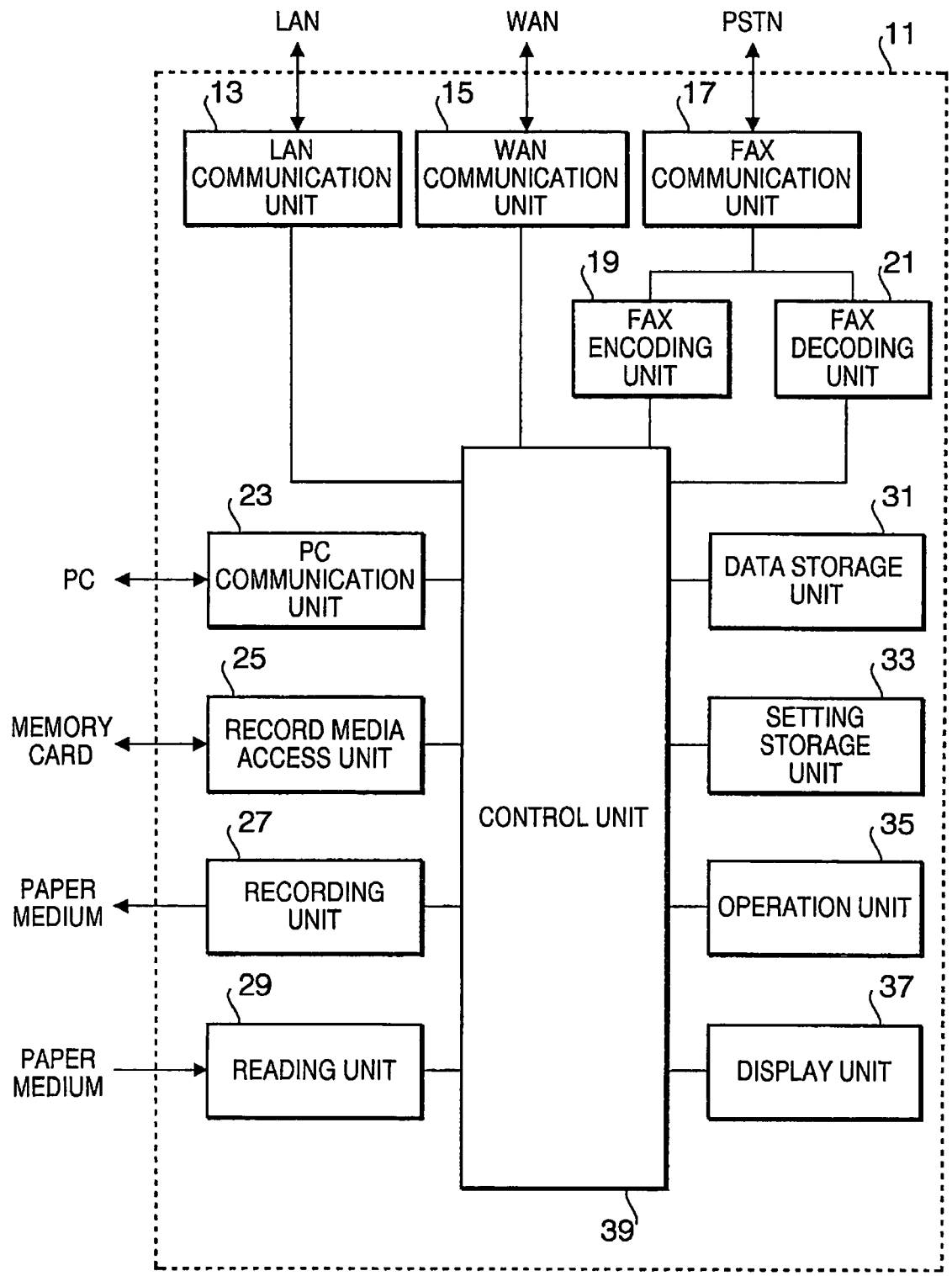
FIG. 1 is a block diagram showing an illustrative example of a composition of an MFP (Multi Function Peripheral) as an information storage device in accordance with an embodiment of the present invention.

In accordance with an aspect of the present invention, there is provided an information storage device having a storage function for storing information inputted thereto and outputting the stored information afterward, comprising an input unit, which inputs information to the information storage device, an output unit, which outputs the information inputted by the input unit, a storage unit, which stores the information inputted by the input unit, a storage inquiry unit, which outputs an inquiry concerning whether or not to let the storage unit store the information inputted by the input unit, a storage inquiry result reception unit, which receives an instruction from a user in response to the inquiry outputted by the storage inquiry unit, and a storage control unit. The storage control unit controls the output unit to output the information when the information is inputted by the input unit, controls the storage inquiry unit to execute the inquiry, and controls the storage unit to store the information inputted by the input unit if the instruction received by the storage inquiry result reception unit designates storage of the information in the storage unit while preventing the storage unit from storing the information inputted by the input unit if the instruction does not designate the storage of the information in the storage unit.

The inquiry by the storage inquiry unit may be executed either after the output unit has finished outputting the information or while the output unit is outputting the information, as long as the user checking the information outputted by the output unit can judge whether the information is worth storing in the storage unit or not. The information may be image data, for example.

By the information storage device configured as above, the user checking the outputted information can judge whether the information should be stored in the storage unit or not and give the instruction according to the judgment. Therefore, the problem with conventional information storage devices: storage of information in an undesired state (not desired or intended by the user) in the storage unit to be disclosed, can be eliminated. Further, the user is relieved of the task of checking already-stored information and executing the deleting operation afterward.

While the inquiry executed by the storage inquiry unit may simply inquire of the user whether or not to let the storage unit store the information, the inquiry may also inquire whether the storage of the information should be normal storage or reservation storage. In this case, the storage control unit controls the storage unit to store the information inputted by the input unit as normal storage information if the instruction received by the storage inquiry result reception unit designates the normal storage, while letting the storage unit store the information inputted by the input unit as reservation storage information if the instruction designates the reservation storage. Incidentally, the "normal storage" and "reservation storage" are attributes, which are defined only formally. Therefore, it is possible to handle the normal storage information (stored in the storage unit) as information that can be disclosed while handling the reservation storage information as information not to be disclosed, for example.

By the information storage device configured as above, the information stored in the storage unit as the reservation storage information and the information stored in the storage unit as the normal storage information can be discriminated from each other and used differently.

It is desirable that the information stored in the storage unit as the reservation storage information can be changed into the normal storage information or deleted from the storage unit afterward based on a judgment made by the user. Specifically, the information storage device may further comprise: a change/deletion inquiry unit, which outputs an inquiry concerning whether to change specific information stored in the storage unit as the reservation storage information into the normal storage information or to delete the information from the storage unit; and a change/deletion inquiry result reception unit, which receives an instruction from the user in response to the inquiry outputted by the change/deletion inquiry unit. In this case, the storage control unit changes the specific information stored in the storage unit as the reservation storage information into the normal storage information if the instruction received by the change/deletion inquiry result reception unit designates the change, while deleting the specific information from the storage unit if the instruction designates the deletion.

By the information storage device configured as above, the user who has ordered the storage of the information in the storage unit as the reservation storage information can change the information into the normal storage information or delete the information from the storage unit afterward. Therefore, the user is allowed to postpone the decision whether or not to store the information in the storage unit.

It is preferable that necessary information on the reservation storage information (as the target of the change into the normal storage information or the deletion from the storage unit) be outputted in the form of a list. Specifically, the information storage device may further comprise a reservation storage information output unit, which outputs a list of information regarding the information stored in the storage unit as the reservation storage information.

By the information storage device configured as above, the user can recognize some or all the information that has been stored and accumulated in the storage unit as the reservation storage information by checking the list outputted by the reservation storage information output unit, by which the user can easily find and select a piece of reservation storage information to be changed into the normal storage information or to be deleted from the storage unit.

Each piece of information stored in the storage unit as the reservation storage information may be processed automatically after a prescribed time period has passed. Specifically, the storage control unit may change the information stored in the storage unit as the reservation storage information into the normal storage information or delete the information from the storage unit according to a previously made setting when a prescribed time period has passed since the storage of the information in the storage unit as the reservation storage information.

By the information storage device configured as above, each piece of information stored as the reservation storage information is prevented from being held untouched in the storage unit and left undisclosed for a long time (by being forgotten by the user, etc.).

While the storage control unit may let the storage inquiry unit execute the inquiry for each piece of information inputted by the input unit, the information storage device may also be configured to previously inquire of the user whether or not to let the storage inquiry unit execute the inquiry. Specifically, the information storage device may further comprise: a prior inquiry unit, which outputs an inquiry concerning whether or not to let the storage inquiry unit execute the inquiry when the information is inputted by the input unit; and a prior inquiry result reception unit, which receives an instruction from the user in response to the inquiry outputted by the prior inquiry unit. In this case, the storage control unit may let the storage inquiry unit execute the inquiry and carry out the subsequent process only if the instruction received by the prior inquiry result reception unit designates the execution of the inquiry. Incidentally, the "subsequent process" means the process executed by the storage control unit: letting the storage unit store the information inputted by the input unit if the instruction received by the storage inquiry result reception unit designates storage of the information in the storage unit while preventing the storage unit from storing the information inputted by the input unit if the instruction does not designate the storage of the information in the storage unit.

By the information storage device configured as above, the user can save the trouble of answering each inquiry (concerning whether or not to let the storage unit store each piece of information inputted by the input unit) in cases where the user previously knows that it is unnecessary to store each piece of input information (inputted to the information storage device) in the storage unit.

The storage control unit may also be configured to operate differently from the above example regarding the instruction from the user in response to the inquiry outputted by the prior inquiry unit. Specifically, the storage control unit may let the storage inquiry unit execute the inquiry and carry out the subsequent process if the instruction received by the prior inquiry result reception unit designates the execution of the inquiry, while letting the storage unit store the information inputted by the input unit without letting the storage inquiry unit execute the inquiry if the instruction received by the prior inquiry result reception unit does not designate the execution of the inquiry.

By the information storage device configured as above, the user can save the trouble of answering each inquiry (concerning whether or not to let the storage unit store each piece of information inputted by the input unit) in cases where the user hopes to store every piece of input information in the storage unit.

While the information storage device may comprise only one input unit and output unit, the information storage device may also be provided with two or more units functioning as the input unit or two or more units functioning as the output unit.

By the information storage device configured as above, when the device comprises two or more input units, an increased number of types of information can be inputted to the device and the input of information to the device can be carried out more properly, since the information can be inputted in various ways corresponding to the characteristics of the input units. When the information storage device comprises two or more output units, the user can check the result of information output by an output unit suitable for each piece of information, by which the user can make the judgment (on whether or not to let the storage unit store the information) properly.

While various types of units (a liquid crystal display for displaying the information as an image, a network interface for transmitting the information to a terminal on a network, etc.) can be employed as the output unit, it is preferable that the output unit be a unit printing the information on a print medium.

By the information storage device configured as above, the user can actually check the information printed on the print medium, by which the information can be stored in the storage unit in a desirable state (having no problem when the information stored in the storage unit is outputted and printed out afterward).

The output unit can also be a unit displaying the information on a display screen.

By the information storage device configured as above, the user can actually check the information displayed on the display screen, by which the information can be stored in the storage unit in a desirable state (having no problem when the information stored in the storage unit is outputted afterward).

The information storage device may further comprise: a communication unit, which is connected to a communication network to execute communication via the communication network; and a transmission control unit, which transmits the information stored in the storage unit to a terminal on the communication network via the communication unit when a request from the terminal is received via the communication unit.

By the information storage device configured as above, when the device is configured to automatically create, present and publish a Web page of a document (as the object of processing) in response to simple and easy operations by the user (like those for printing, copying, etc.) similarly to the conventional MFP for example, the disclosure of the document in an undesirable state until the user notices the state can be prevented from occurring and the Web page of the document can securely be disclosed in a state desired and intended by the user. Since such an information storage device is capable of transmitting the stored information to a terminal on the communication network according to a request from the terminal, a user of the terminal can use (read, browse, process, etc.) the information obtained from the information storage device, by which the information stored in the storage unit can be utilized effectively with ease. Specifically, the information may be stored in the storage unit in the HTML format, and the information requested by the terminal may be transmitted to the terminal according to the HTTP protocol, for example.

In accordance with another aspect of the present invention, there is provided an information storage method comprising the steps of: inputting information to an information storage device; outputting the inputted information; inquiring of a user whether or not to store the inputted information; and storing the inputted information in a storage unit if an instruction for the storage of the information is received from the user while canceling the storage of the inputted information in the storage unit if an instruction against the storage of the information is received from the user.

By the information storage method configured as above, the user checking the outputted information can judge whether the information should be stored in the storage unit or not and give the instruction according to the judgment. Therefore, the problem with conventional information storage methods: storage of information in an undesired state (not desired or intended by the user) in the storage unit to be disclosed, can be eliminated. Further, the user is relieved of the task of checking already-stored information and executing the deleting operation afterward.

The storage of information in the storage unit may include normal storage and reservation storage. In this case, the inputted information may be stored in the storage unit as normal storage information if an instruction from the user in response to the inquiry designates the normal storage, while storing the inputted information in the storage unit as reservation storage information if the instruction from the user in response to the inquiry designates the reservation storage. The "normal storage" and "reservation storage" are attributes, which are defined only formally. Therefore, it is possible to handle the normal storage information (stored in the storage unit) as information that can be disclosed while handling the reservation storage information as information not to be disclosed, for example.

By the information storage method configured as above, the information stored in the storage unit as the reservation storage information and the information stored in the storage unit as the normal storage information can be discriminated from each other and used differently.

The information storage method may further comprise the step of inquiring of the user whether to change specific information stored in the storage unit as the reservation storage information into the normal storage information or to delete the information from the storage unit. In this case, the specific information stored in the storage unit as the reservation storage information is changed into the normal storage information if an instruction designating the change is received from the user, while the specific information is deleted from the storage unit if an instruction designating the deletion is received from the user.

By the information storage method configured as above, the user who has ordered the storage of the information in the storage unit as the reservation storage information can change the information into the normal storage information or delete the information from the storage unit afterward. Therefore, the user is allowed to postpone the decision whether or not to store the information in the storage unit.

Each piece of information stored in the storage unit as the reservation storage information may be processed automatically after a prescribed time period has passed. Specifically, the information stored in the storage unit as the reservation storage information may be changed into the normal storage information or deleted from the storage unit according to a previously made setting when a prescribed time period has passed since the storage of the information in the storage unit as the reservation storage information.

By the information storage method configured as above, each piece of information stored as the reservation storage information is prevented from being held untouched in the storage unit and left undisclosed for a long time (by being forgotten by the user, etc.).

While the inquiry (concerning whether to store information in the storage unit or not) may be executed for each piece of information inputted to the information storage device, the information storage method may further comprise the step of inquiring of the user whether or not to execute the inquiry (concerning whether or not to store the inputted information) when the information is inputted. In this case, the inquiry and the subsequent step may be carried out only when an instruction designating the execution of the inquiry is received from the user. Incidentally, the "subsequent step" means the step storing the inputted information in the storage unit if an instruction for the storage of the information is received from the user while canceling the storage of the inputted information in the storage unit if an instruction against the storage of the information is received from the user.

By the information storage method configured as above, the user can save the trouble of answering each inquiry (concerning whether or not to store each piece of input information in the storage unit) in cases where the user previously knows that it is unnecessary to store each piece of input information in the storage unit.

The operation for the above instruction from the user may also be designed differently from the above example. Specifically, the inquiry and the subsequent step may be carried out if an instruction designating the execution of the inquiry is received from the user, while storing the inputted information in the storage unit without executing the inquiry if an instruction not designating the execution of the inquiry is received from the user.

By the information storage method configured as above, the user can save the trouble of answering each inquiry (concerning whether or not to store each piece of input information in the storage unit) in cases where the user hopes to store every piece of input information in the storage unit.

The information storage method may further comprise the step of transmitting the information stored in the storage unit to a terminal on a communication network when a request from the terminal is received.

By the information storage method configured as above, the disclosure of a document in an undesirable state until the user notices the state can be prevented from occurring and a Web page of the document can securely be disclosed in a state desired and intended by the user, for example. Since the information stored in the storage unit can be transmitted to a terminal on the communication network according to a request from the terminal, a user of the terminal can use (read, browse, process, etc.) the information obtained from the information storage device, by which the information stored in the storage unit can be utilized effectively with ease.

It is noted that various connections are set forth between elements in the following description. It is noted that these connections in general and, unless specified otherwise, may be direct or indirect and that this specification is not intended to be limiting in this respect.

Embodiment of the Present Invention

Referring now to the drawings, a description will be given in detail of a preferred embodiment in accordance with the present invention.

FIG. 1 is a block diagram showing the overall composition of an MFP (Multi Function Peripheral) 11 as an information storage device in accordance with one or more embodiments of the present invention. The MFP 11 includes a LAN (Local Area Network) communication unit 13, a WAN (Wide Area Network) communication unit 15, a FAX communication unit 17, a FAX encoding unit 19, a FAX decoding unit 21, a PC communication unit 23, a record media access unit 25, a recording unit 27, a reading unit 29, a data storage unit 31, a setting storage unit 33, an operation unit 35, a display unit 37 and a control unit 39.

The LAN communication unit 13 can be connected to a LAN and communicates with various devices connected to the LAN. The WAN communication unit 15 is connected to a WAN and communicates with various devices connected to the WAN.

The FAX communication unit 17 may be connected to a PSTN (Public Switched Telephone Network). The FAX communication unit 17 transmits encoded data (supplied from the FAX encoding unit 19) to other devices connected to the PSTN, while sending received data (received from other devices connected to the PSTN) to the FAX decoding unit 21.

The FAX encoding unit 19 encodes data supplied from the control unit 39 according to a facsimile standard and sends the encoded data to the FAX communication unit 17. The FAX decoding unit 21 decodes data (according to a facsimile standard) supplied from the FAX communication unit 17 into data that can be processed by the control unit 39, and sends the decoded data to the control unit 39.

The PC communication unit 23 has a function of communicating with a personal computer using a communication standard (for instance, USB, IEEE1394, etc.) according to instructions from the control unit 39. The record media access unit 25 makes access to a memory card (record medium) and reads/writes data from/to the memory card according to instructions from the control unit 39.

The recording unit 27 records an image on a medium such as paper (hereinafter referred to as a "paper medium") by a recording method like the laser image transfer method, the ink jet printing method, etc. according to instructions from the control unit 39. The reading unit 29 reads an image recorded on a paper medium with image pickup elements (e.g. CCDs) and generating image data according to instructions from the control unit 39.

The data storage unit 31, implemented for instance by a hard disk, stores and outputs data according to instructions from the control unit 39. It is appreciated that the data storage unit 31 may be any data storage unit as well (solid state memory, and the like). The data storage unit 31 includes a contents table for storing attribute data regarding input data and a data table for storing the input data. For example, when the MFP 11 receives FAX data, data regarding the attributes of the FAX data are stored in the contents table, while the FAX data itself (image data) is stored in the data table.

The setting storage unit 33 is a storage unit for storing information (setting information) on the settings of the MP 11 (regarding the operation of the MFP 11), which have been made by the user by operating the operation unit 35, etc. The setting storage unit 33 is implemented by a flash memory, for example. Incidentally, the setting information may or may not include secret keyword data.

The operation unit 35 includes a touch panel formed integrally with a display screen of the display unit 37 and mechanical keys arranged in the vicinity of the display unit 37. The operation unit 35 is used by the user of the MFP 11 for inputting various instructions, etc.

The display unit 37, which can be implemented by a liquid crystal display, an organic EL display, etc., displays a variety of information according to instructions from the control unit 39. The control unit 39 is mainly composed of a well-known microcomputer including a CPU (Central Processing Unit); a ROM (Read Only Memory), a RAM (Random Access Memory), an SRAM (Static RAM), an I/O interface and bus lines connecting the components together. The control unit 39 controls the above components according to programs stored in the ROM and thereby executes various processes.

Next, each field of the contents table and the data table stored in the data storage unit 31 will be explained referring to FIGS. 2A and 2B. FIG. 2A is a schematic diagram explaining each field of the contents table. The contents table includes contents ID 51a, record status 51b, date/time 51c, user 51d, input source 51e, security attribute 51f, electronic watermark information 51g, function type 51h, function-specific attribute 51i and data ID 51j.

The contents ID 51a is a field for storing an ID for identifying each record. The IDs are assigned to records so as to increase in order of generation of the records.

The record status 51b is a field for storing information indicating the status of the record. Specifically, the record status 51b can indicate a locked status (update prohibition status), an invalid status (due to deletion), a reserved status, etc.

The date/time 51c is a field for storing the data and time of the generation of the record.

The user 51d is a field for storing information for identifying a user who inputted the data. When the user who inputted the data can not be identified, the user 51d is left as an empty field.

The input source 51e is a field for storing information indicating an input source of the data. In the input source 51e, information that can specify the LAN communication unit 13, the WAN communication unit 15, the FAX communication unit 17, the PC communication unit 23, the record media access unit 25 or the reading unit 29 is stored. In cases where the input source is the LAN communication unit 13, the WAN communication unit 15 or the FAX communication unit 17, information on the source (sender) of the data (the IP address of a PC, the FAX number of a source FAX, etc.) is also stored in the input source 51e.

The security attribute 51f is a field for storing information regarding the disclosure of the data. Specifically, information indicating one selected from "total disclosure", "intracompany disclosure", "partner disclosure" and "no disclosure" is stored in the security attribute 51f.

The electronic watermark information 51g is a field for storing a code which is generated from the manufacturer's serial number of the MFP 11 and the date and time stored in the date/time 51c field (or any other information that can identify or somehow designate the MFP 11).

The function type 51h is a field for storing information on the type of function. The "function" includes a print function, a copy function, a FAX transmission function, a FAX reception function, a PC-FAX transmission function, a scanner function, a media print function, a media storage function, and a mail transfer function.

The function-specific attribute 51i is a field for storing information on attributes that are specific to the function. For example, when the function is the FAX transmission function, the function-specific attribute 51i stores information on the mode used for transmission, the magnification (scaling factor) used for transmission, the resolution used for image reading, the layout, whether the image is monochrome or color, the destination, the output resolution supported by the destination, etc.

The data ID 51j is a field for storing an ID for identifying the input data. Each piece of input data stored in the aforementioned data table can be identified by the ID.

Next, each field of the data table for storing the input data will be explained referring to FIG. 2B. The data table includes data ID 53a, reference number 53b, data format 53c, data size 53d and actual data 53e.

The data ID 53a is a field for storing an ID for identifying each record. The data ID 53a corresponds to the data ID 51j of the contents table explained above.

The reference number 53b is a field for storing the number of records of the contents table referring to the record.

The data format 53c is a field for storing information on the format (print data, FAX data, JPEG, text, etc.) of the input data.

The data size 53d is a field for storing the data size of the input data.

The actual data 53e is a field for storing the input data itself.

The MFP 11 has the functions mentioned above. Specifically, the functions of the MFP 11 includes the print function (in which the LAN communication unit 13 receives data from the LAN (inputs data to the MFP 11) and the recording unit 27 outputs the data to a paper medium), the PC-FAX transmission function (in which the LAN communication unit 13 receives data from the LAN (inputs data to the MFP 11) and the FAX communication unit 17 outputs the data to the PSTN), the copy function (in which the reading unit 29 reads data from a paper medium (inputs data to the MFP 11) and the recording unit 27 outputs the data to a paper medium), the FAX transmission function (in which the reading unit 29 reads data from a paper medium (inputs data to the MFP 11) and the FAX communication unit 17 outputs the data to the PSTN), the FAX reception function (in which the FAX communication unit 17 receives data from the PSTN (inputs data to the MFP 11) and the recording unit 27 outputs the data to a paper medium), the scanner function (in which the reading unit 29 reads data from a paper medium (inputs data to the MFP 11) and the LAN communication unit 13 outputs the data to the LAN), the media storage function (in which the reading unit 29 reads data from a paper medium (inputs data to the MFP 11) and the record media access unit 25 outputs the data to a record medium), the media print function (in which the record media access unit 25 reads data from a record medium (inputs data to the MFP 11) and the recording unit 27 outputs the data to a paper medium), and the mail transfer function (in which the LAN communication unit 13 receives mail data from the LAN (inputs data to the MFP 11) and the WAN communication unit 15 outputs the data to the WAN, or the WAN communication unit 15 receives mail data from the WAN (inputs data to the MFP 11) and the LAN communication unit 13 outputs the data to the LAN).

As above, units for inputting data to the MFP 11 include the LAN communication unit 13, the WAN communication unit 15, the FAX communication unit 17, the PC communication unit 23, the record media access unit 25 and the reading unit 29, while units for outputting data include the communication unit 13, the WAN communication unit 15, the FAX communication unit 17, the PC communication unit 23, the record media access unit 25, the recording unit 27 and the display unit 37.

Next, processes executed by the control unit 39 will be described below. In the following description, only processes characteristic of the present invention will be explained, that is, explanation of processes executed by ordinary MFPs having a data storage function (a process for outputting stored data, a process by the print function, a process by the FAX transmission function, etc.) are omitted for brevity.

(1) Input Process

An input process will be described below referring to a flow chart of FIG. 3. The input process is started when the MFP 11 receives an input instruction of some type (a copy instruction issued by operating the operation unit 35, a print instruction issued by operating a personal computer connected to the MFP 11, etc.).

The control unit 39 starting the input process obtains instruction information first (S105). The "instruction information" includes information specifying the function and additional information necessary for implementing the function.

Figure 7:
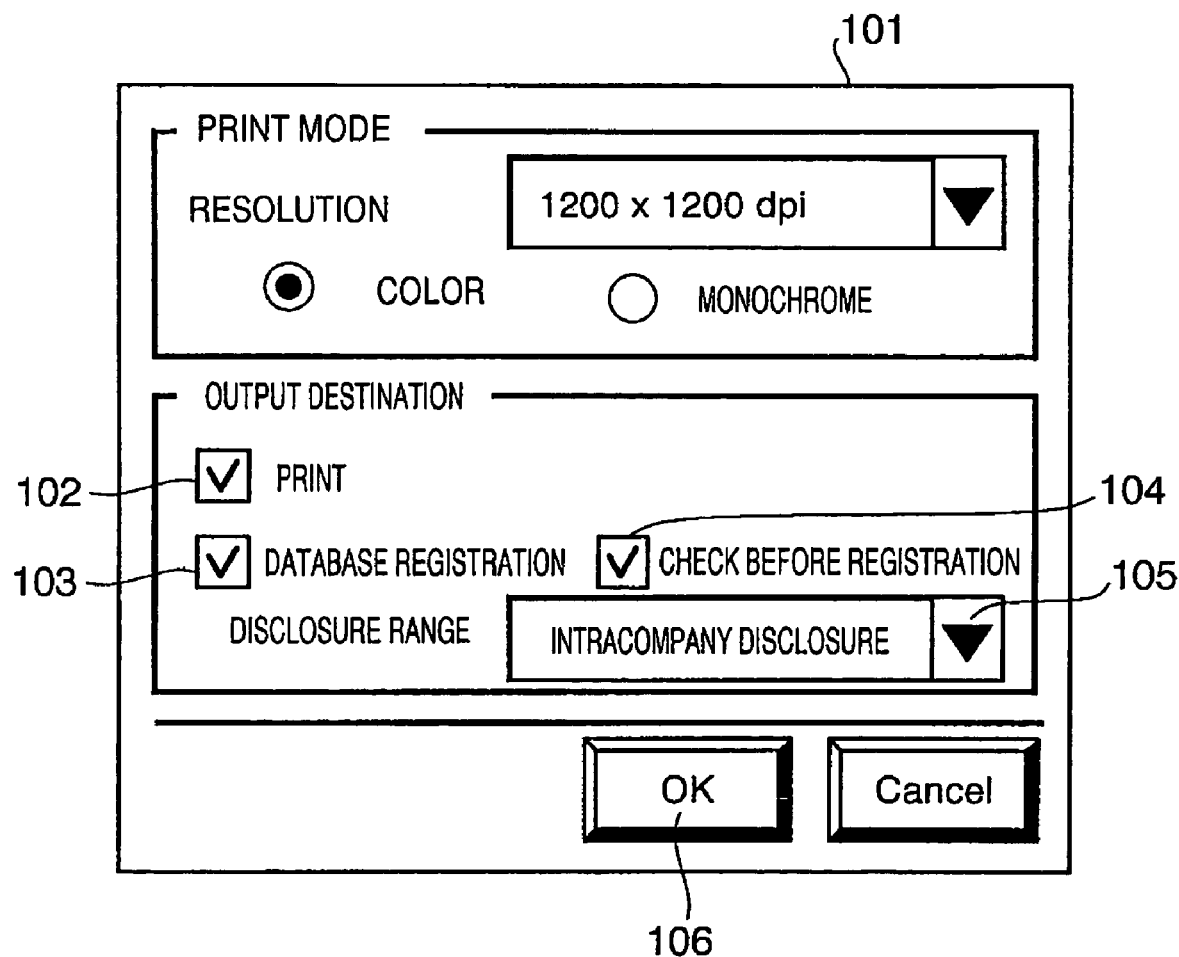
FIG. 7 is a schematic diagram showing an example of a print instruction screen in accordance with aspects of the present invention.

Here, some examples of screens displayed when the user inputs the "instruction information" will be explained. FIG. 7 is a schematic diagram showing an example of a print instruction screen displayed on a monitor of a personal computer connected to the MFP 11. A screen 101 shown in FIG. 7 is designed to let the user designate a print mode (resolution, color/monochrome) and an output destination (whether to print or not, whether to register data in a database or not, whether to check before registration or not, and a disclosure range after the registration in the database). Incidentally, while whether to print or not (ON/OFF of a check box 102) and whether to register data in the database or not (ON/OFF of a check box 103) can be designated independently, whether to check before registration or not (ON/OFF of a check box 104) and the disclosure range after the registration in the database (selection from a drop-down list 105) can be designated only when the database registration has been selected (only when the check box 103 has been turned ON). When an OK command button 106 is pressed, information on the selections made on the screen 101 is transmitted to the MFP 11.

Figure 8:
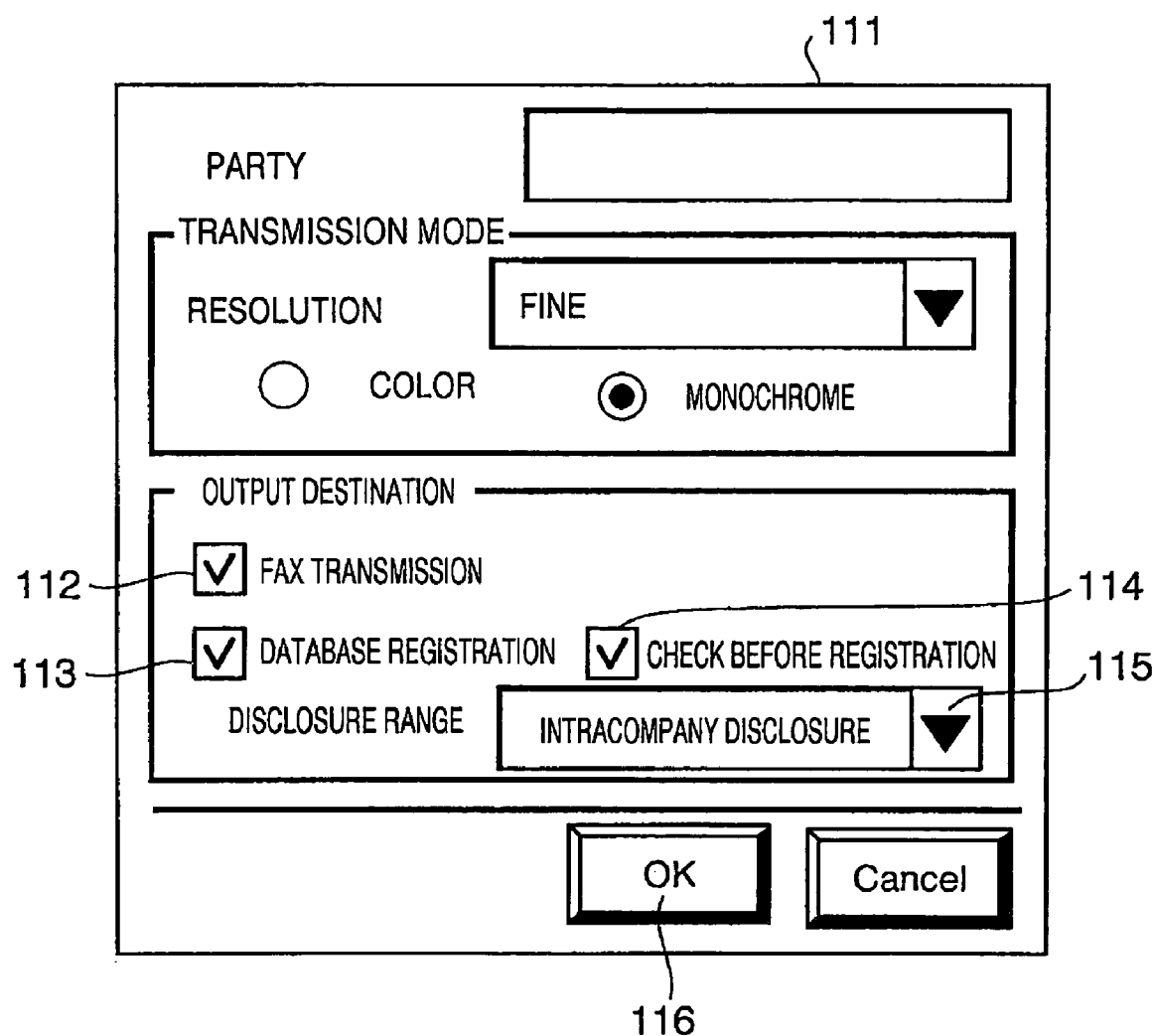
FIG. 8 is a schematic diagram showing an example of a PC-FAX transmission instruction screen in accordance with aspects of the present invention.

FIG. 8 is a schematic diagram showing an example of a PC-FAX transmission instruction screen displayed on the monitor of the personal computer connected to the MFP 11. A screen 111 shown in FIG. 8 is designed to let the user designate the phone number of a party (destination of FAX), transmission mode (resolution, color/monochrome) and an output destination (whether to execute FAX transmission or not, whether to register data in the database or not, whether to check before registration or not, and a disclosure range after the registration in the database). While whether to execute FAX transmission or not (ON/OFF of a check box 112) and whether to register data in the database or not (ON/OFF of a check box 113) can be designated independently, whether to check before registration or not (ON/OFF of a check box 114) and the disclosure range after the registration in the database (selection from a drop-down list 115) can be designated only when the database registration has been selected (only when the check box 113 has been turned ON). When an OK command button 116 is pressed, information on the selections made on the screen 111 is transmitted to the MFP 11.

Figure 9:
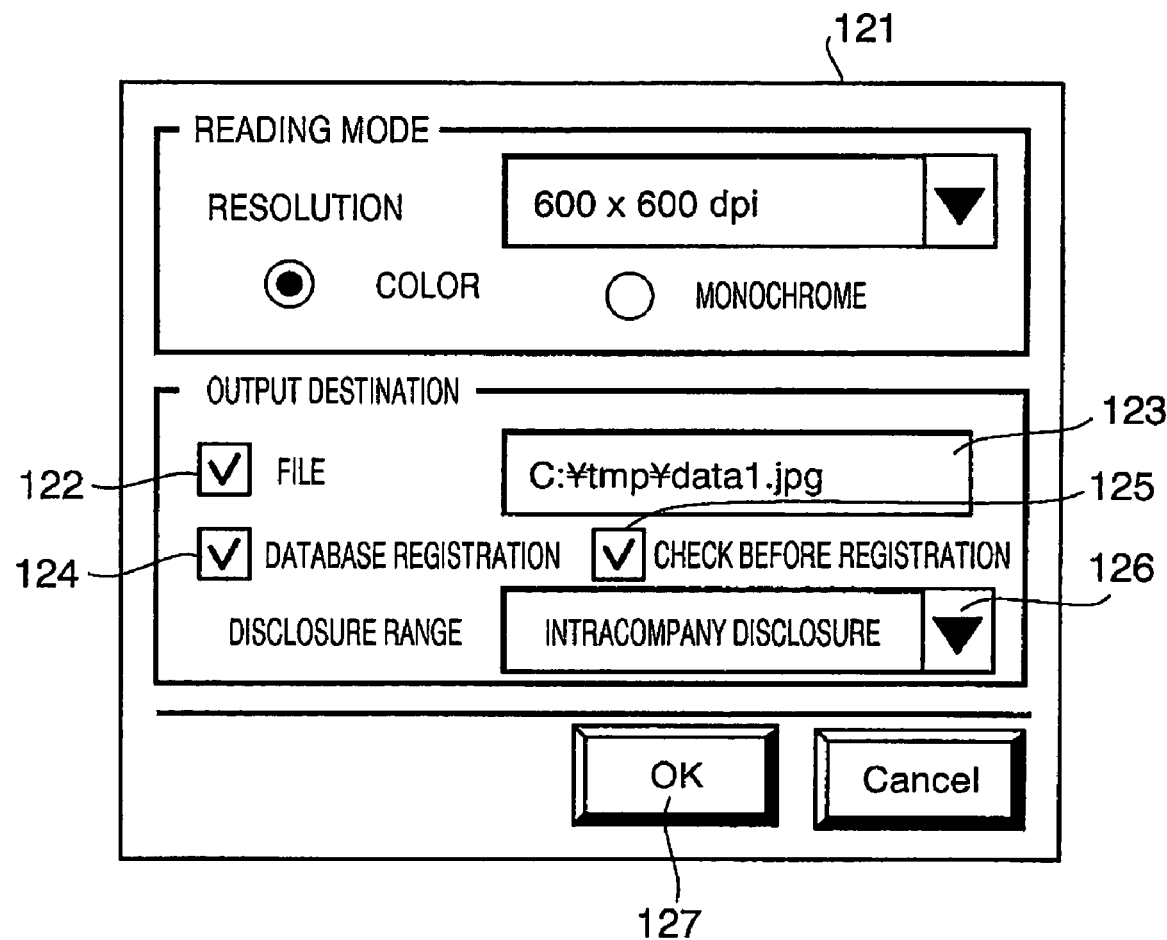
FIG. 9 is a schematic diagram showing an example of a scanner instruction screen in accordance with aspects of the present invention.

FIG. 9 is a schematic diagram showing an example of a scanner instruction screen displayed on the monitor of the personal computer connected to the MFP 11. A screen 121 shown in FIG. 9 is designed to let the user designate a reading mode (resolution, color/monochrome) and an output destination (whether to output a file or not, the name of the output file, whether to register data in the database or not, whether to check before registration or not, and a disclosure range after the registration in the database). While whether to output a file or not (ON/OFF of a check box 122) and whether to register data in the database or not (ON/OFF of a check box 124) can be designated independently, the name of the output file (text box 123) can be designated only when the file output has been selected (only when the check box 122 has been turned ON). Similarly, whether to check before registration or not (ON/OFF of a check box 125) and the disclosure range after the registration in the database (selection from a drop-down list 126) can be designated only when the database registration has been selected (only when the check box 124 has been turned ON). When an OK command button 127 is pressed, information on the selections and input made on the screen 121 is transmitted to the MFP 11.

While three examples have been explained above referring to FIGS. 7-9, whether to register data in the database (the contents table and the data table of the data storage unit 31) or not and whether to check (the result of output) before registration or not are similarly selected on any instruction screen (also on screens other than FIGS. 7-9 for other functions). While the selections explained above are made when the user issues an instruction from a personal computer connected to the MFP 11, the user can make similar selections when he/she directly inputs an instruction to the MFP 11 by operating the operation unit 35.

Figure 3:
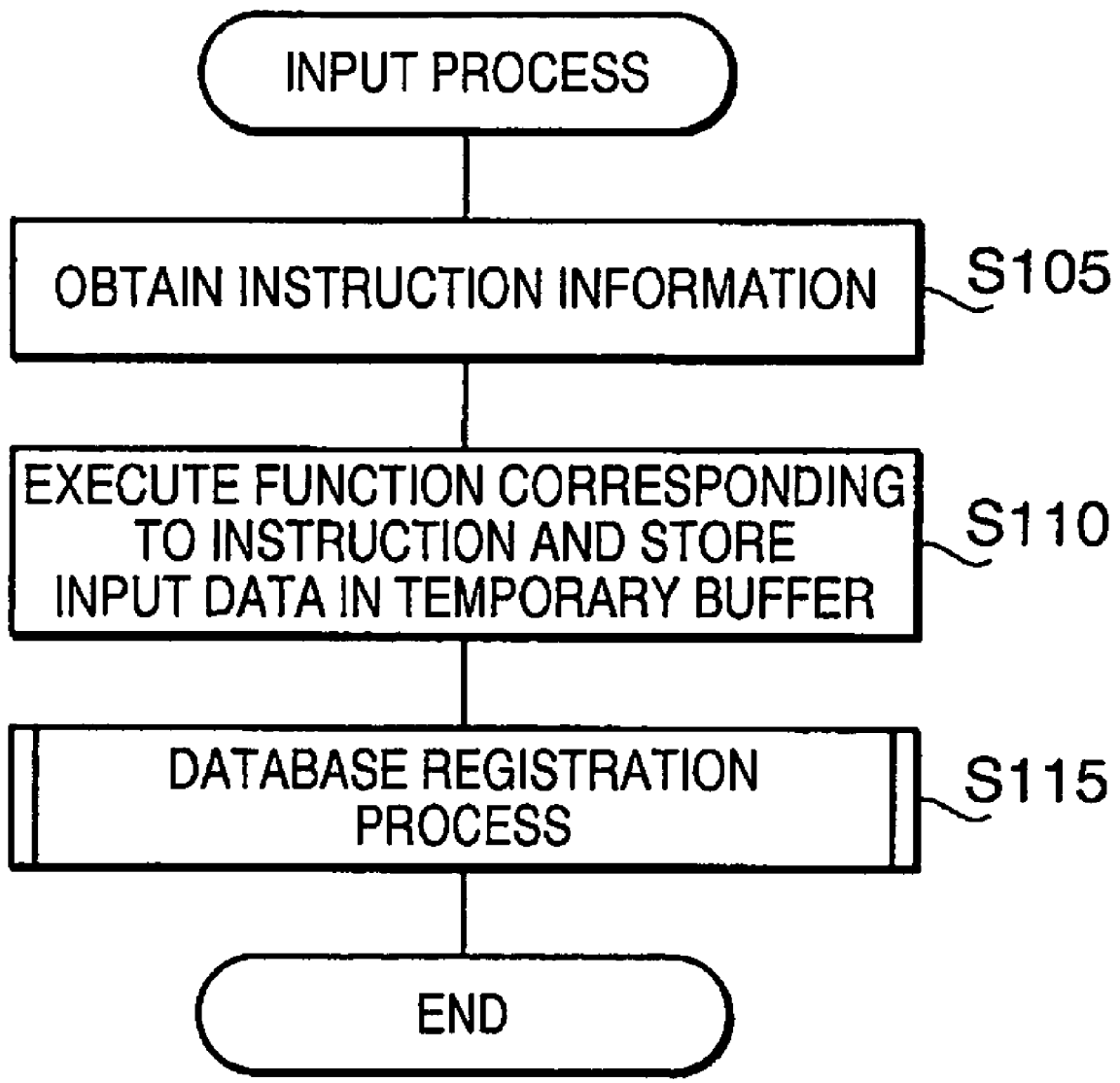
FIG. 3 is a flow chart showing an input process executed by the MFP in accordance with aspects of the present invention.

Returning to the flow chart of FIG. 3, in the next step S110, a function (process) corresponding to the instruction (a print process, a FAX transmission, etc.) is executed and data inputted in the process (print data, FAX transmission data, etc.) is stored in a temporary buffer. The "temporary buffer" means a temporary storage area of the control unit 39.

Subsequently, a database registration process for registering the data in the database is called and executed (S115). When the database registration process is completed, the input process is ended.

(2) Database Registration Process

Next, the database registration process executed by the control unit 39 will be described referring to a flow chart of FIG. 4. The database registration process is called and executed in the input process which has been described above.

The control unit 39 starting the database registration process first judges whether or not the "database registration" has been designated for the data stored in the temporary buffer (S605). If the database registration has been designated (S605: YES), the process advances to step S608, otherwise (S605: NO) the process advances to step S640.

In the step S608, whether the "check before registration" has been designated for the data stored in the temporary buffer or not is judged. If the check before registration has been designated (S608: YES), the process advances to step S610, otherwise (S608: NO) the process advances to step S615.

Figure 10:
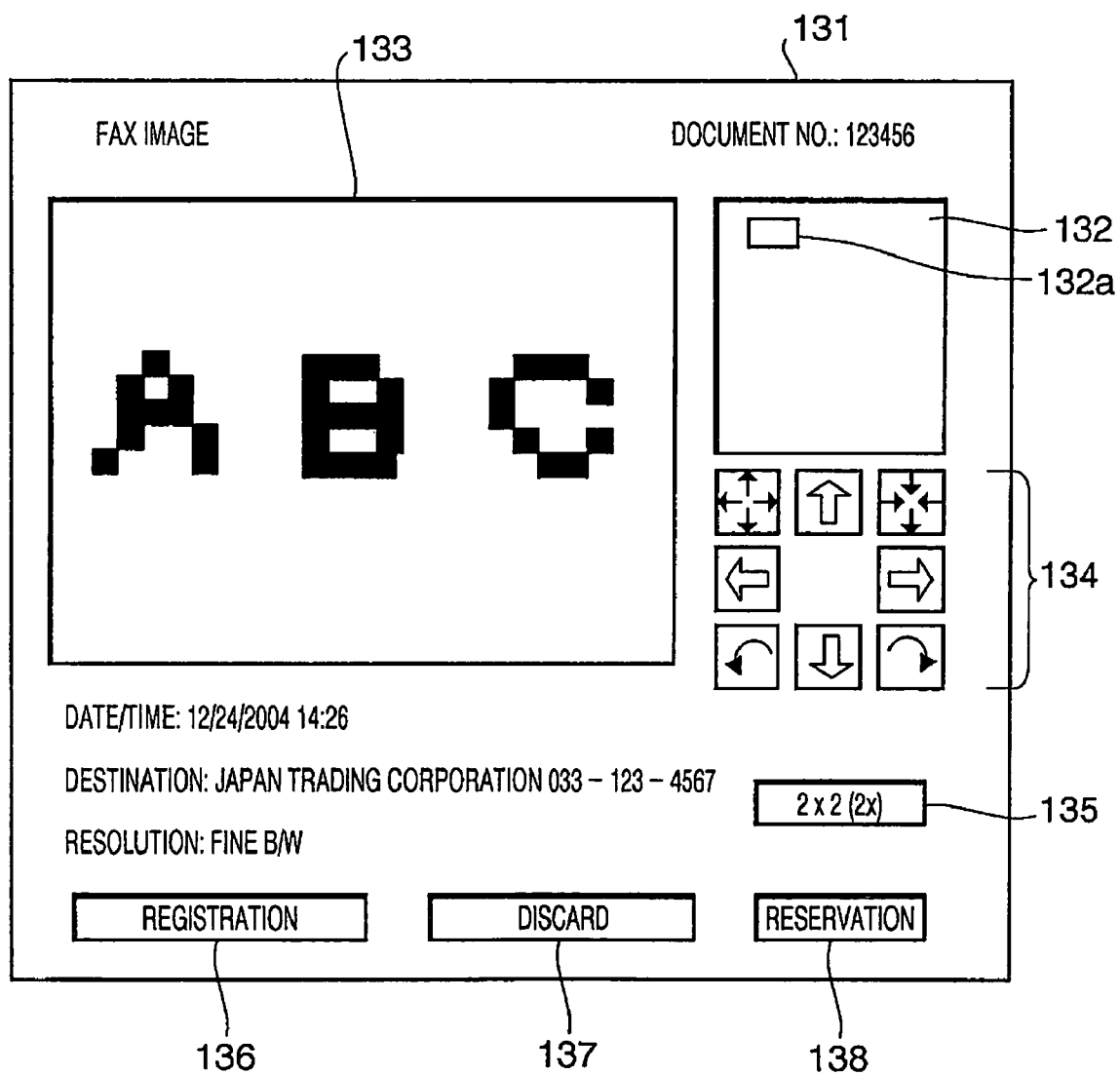
FIG. 10 is a schematic diagram showing an example of a check screen for inquiring of the user whether or not to register data in a database in accordance with aspects of the present invention.

In the step S610, a check screen (for inquiring of the user whether or not to register the data in the database) is outputted. An example of the check screen will be explained below referring to FIG. 10. The check screen 131 shown in FIG. 10 is a screen for inquiring of the user whether or not to register an image which has been transmitted by the FAX transmission function. The check screen 131 includes a display range indication area 132, an image area 133, display change command buttons 134, a magnification change command button 135, a registration command button 136, a discard command button 137 and a reservation command button 138.

The display range indication area 132 is an area indicating a range (portion) of the image being displayed in the image area 133. Specifically, a portion surrounded by a specified area 132a in the display range indication area 132 is displayed in the whole image area 133.

The image area 133 is an area for displaying the image, in which the portion of the image surrounded by the specified area 132a in the display range indication area 132 is magnified and displayed.

The display change command buttons 134 include command buttons for changing the position of the range of the image displayed in the image area 133, command buttons for changing the size of the range of the image displayed in the image area 133, command buttons for rotating the range of the image displayed in the image area 133, etc. According to the operation of the display change command buttons 134 by the user, the specified area 132a in the display range indication area 132 changes and the (partial) image displayed in the image area 133 changes correspondingly.

The magnification change command button 135 is used for changing display magnification. By pressing the magnification change command button 135, the display magnification is changed so as to change the magnification of the image displayed in the image area 133. According to the change of the magnification, the caption ("2×2" in FIG. 10) displayed on the magnification change command button 135 also changes. Candidates of the display magnification include "same size" (×1), "1×2" (×1.4), "2×2" (×2), "2×4" (×2.8), "3×3" (×3) and "2×1" (×2 vertical). The display magnification is changed sequentially as the magnification change command button 135 is pressed, by which one of the candidates is selected by the user.

The registration command button 136 is a button for ordering registration of the displayed image in the database.

The discard command button 137 is a button for ordering discard of the displayed image without registering it in the database.

The reservation command button 138 is a button for ordering reservation registration of the displayed image in the database.

Incidentally, while the check screen 131 explained above is designed to display the FAX image in the image area 133 (since the check screen 131 relates to FAX transmission), in cases where the result of printing can be checked directly (as in the print process and the copy process), there is no need of such an image displayed in the image area 133. In such cases, the check screen may be designed without the display range indication area 132, the image area 133, the display change command buttons 134 and the magnification change command button 135.

Figure 4:
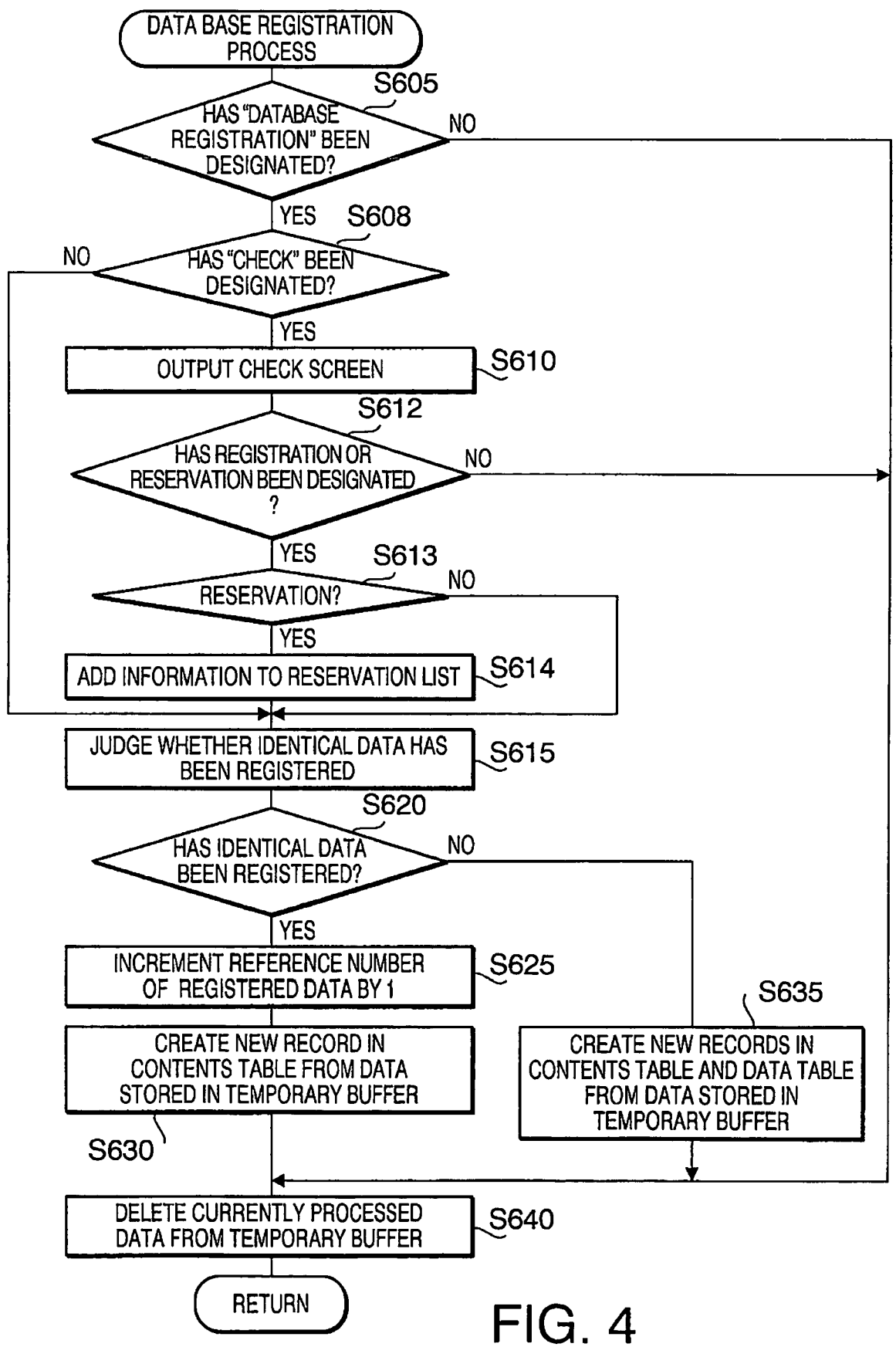
FIG. 4 is a flow chart showing a database registration process executed by the MFP in accordance with aspects of the present invention.

Returning to the flow chart of FIG. 4, in the next step S612, whether the "registration" or "reservation" has been selected on the check screen or not is judged. If the "registration" or "reservation" has been selected (S612: YES), the process advances to step S613. If the "discard" has been selected on the check screen (S612: NO), the process advances to step S640.

In the step S613, whether the "reservation" has been selected on the check screen or not is judged. If the "reservation" has been selected (S613: YES), the process advances to step S614, otherwise (S613: NO) the process advances to step S615.

In the step S614, which is reached when the "reservation" has been selected, information (e.g. date/time and data type) on the data stored in the temporary buffer is added to a reservation list. The "reservation list" is one of lists stored in the data storage unit 31. Thereafter, the process advances to step S615.

In the step S615, whether data identical with the data stored in the temporary buffer has already been stored in the data storage unit 31 or not is judged. While any method can be employed for the judgment, the judgment can be made, for example, by comparing the electronic watermark information of the data stored in the temporary buffer with the electronic watermark information stored in the contents table, by directly comparing the data stored in the temporary buffer with the data stored in the data table by various checking methods, etc.

In the next step S620, the process is branched depending on the result of the step S615. If data identical with the data stored in the temporary buffer has already been stored in the data storage unit 31 (S620: YES), the process advances to step S625, otherwise (S620: NO) the process advances to step S635.

In the step S625 (which is reached when data identical with the data stored in the temporary buffer has already been stored in the data storage unit 31), the value of the reference number 53b of a corresponding record in the data table of the data storage unit 31 is incremented by 1. Subsequently, a new record is created in the contents table from the data stored in the temporary buffer (S630). In this step, when the "reservation" has been selected by the user, information indicating the "reservation" is stored in the record status 51b of the contents table. Thereafter, the process advances to step S640.

Meanwhile, in the step S635 (which is reached when no data identical with the data stored in the temporary buffer has been stored in the data storage unit 31 yet), new records are created in the contents table and the data table from the data stored in the temporary buffer. In this step, when the "reservation" has been selected by the user, information indicating the "reservation" is stored in the record status 51b of the contents table. Thereafter, the process advances to step S640.

In the step S640, the data stored in the temporary buffer is deleted, the database registration process is ended, and the process is returned to the input process, which called the database registration process.

(3) Reserved Data Operation Process

Next, a reserved data operation process executed by the control unit 39 will be described referring to a flow chart of FIG. 5. The reserved data operation process is started when an instruction designating the execution of the reserved data operation process is issued by the user by operating the operation unit 35 of the MFP 11 or a personal computer connected to the MFP 11.

The control unit 39 starting the reserved data operation process first generates a list screen of reserved data from the reservation list and displays the generated list screen on the display unit 37 of the MFP 11 or a monitor of a personal computer connected to the MFP 11 (S705). An example of the reserved data list screen will be explained below referring to FIG. 11. The list screen 141 shown in FIG. 11 includes a grid 142, a deletion command button 143, a check command button 144 and an end command button 145. In the grid 142, information on the reserved data (document No., date/time, document type, etc.) is displayed in a list format so that an arbitrary piece of reserved data can be selected from the list. The deletion command button 143 is a button for ordering deletion of the reserved data selected in the grid 142. The check command button 144 is a button for ordering display of a check screen (similar to the check screen 131 of FIG. 10, for example) for letting the user check the reserved data (image) selected in the grid 142. The end command button 145 is a button for ordering deletion of the list screen 141.

Figure 5:
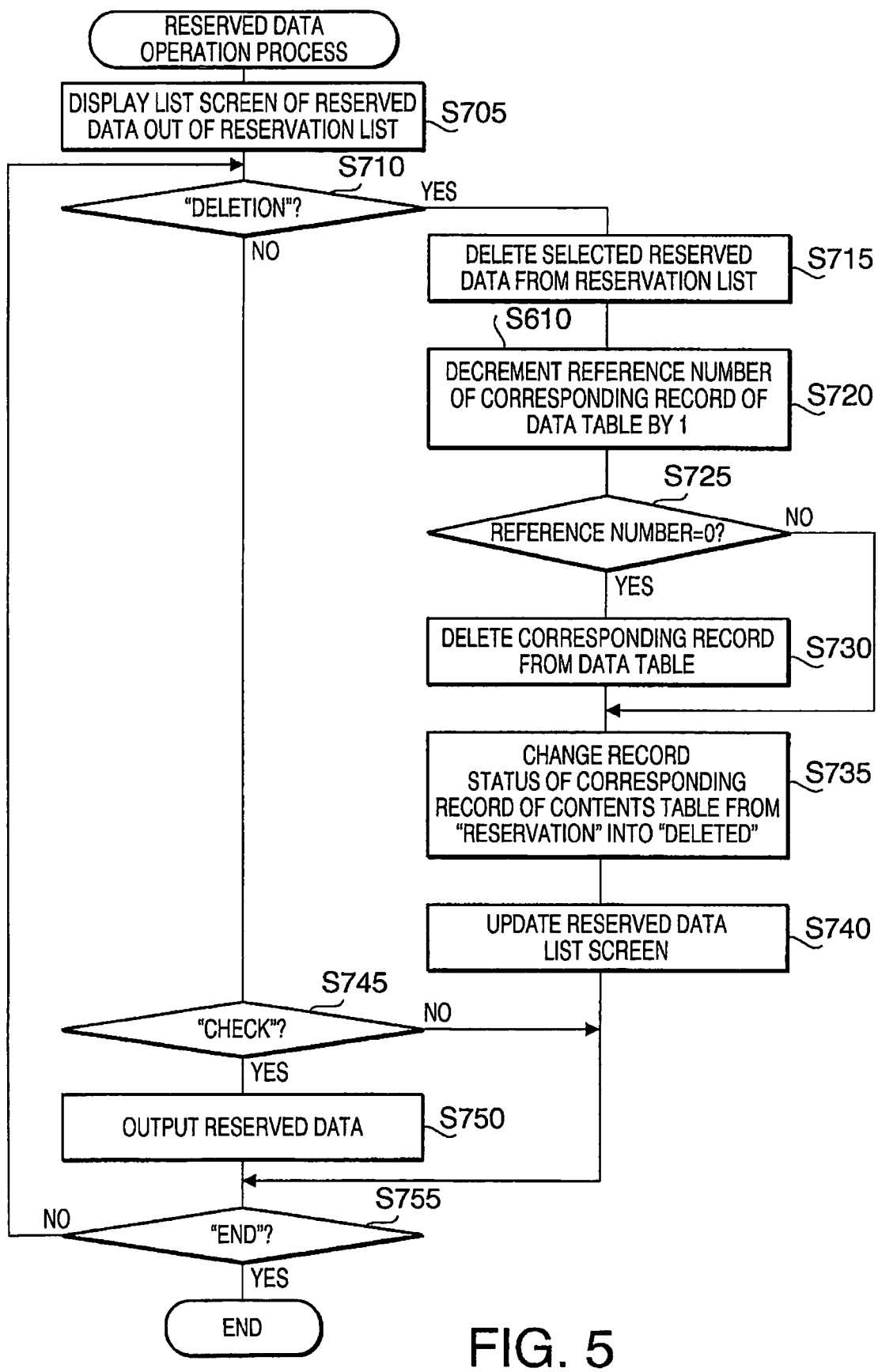
FIG. 5 is a flow chart showing a reserved data operation process executed by the MFP in accordance with aspects of the present invention.

Returning to the flow chart of FIG. 5, in the next step S710, the process is branched depending on whether the "deletion" has been designated in the reserved data list screen (whether the deletion command button 143 shown in FIG. 11 has been pressed) or not. If the "deletion" has been designated (S710: YES), the process advances to step S715, otherwise (S710: NO) the process advances to step S745.

In the step S715 (reached when the "deletion" has been designated in the reserved data list screen), the reserved data selected in the list screen is deleted from the reservation list. Subsequently, the value of the reference number 53b of a record of the data table corresponding to the reserved data is decremented by 1 (S720), and the process is branched depending on whether the value (reference number) has decreased to 0 or not (S725). If the reference number has decreased to 0 (S725: YES), the corresponding record is deleted from the data table (S730) and the process advances to step S735. If the reference number is still larger than 0 (S725: NO), the process directly advances to the step S735.

In the step S735, the information stored in the record status 51b of a record of the contents table corresponding to the reserved data selected in the list screen is changed from information indicating "reservation" into information indicating "deleted". Subsequently, the reserved data list screen is updated (S740), and the process advances to step S755.

Meanwhile, in the step S745 (reached when the "deletion" has not been designated in the reserved data list screen), the process is branched depending on whether the "check" has been designated in the reserved data list screen (whether the check command button 144 shown in FIG. 11 has been pressed) or not. If the "check" has been designated (S745: YES), the process advances to step S750, otherwise (S745: NO) the process advances to step S755.

In the step S750 (reached when the "check" has been designated in the reserved data list screen), the reserved data (image) selected in the reserved data list screen is outputted, and the process advances to step SS755. This "output" can be implemented either by letting the recording unit 27 print out the reserved data (image) or by letting the display unit 37 of the MFP 11 or the monitor of the personal computer connected to the MFP 11 display the reserved data (image).

In the step S755, the process is branched depending on whether the "end" has been designated in the reserved data list screen (whether the end command button 145 shown in FIG. 11 has been pressed) or not. If the "end" has been designated (S755: YES), the reserved data operation process is ended, otherwise (S755: NO) the process is returned to the step S710.

(4) Reserved Data Automatic Process

Figure 6:
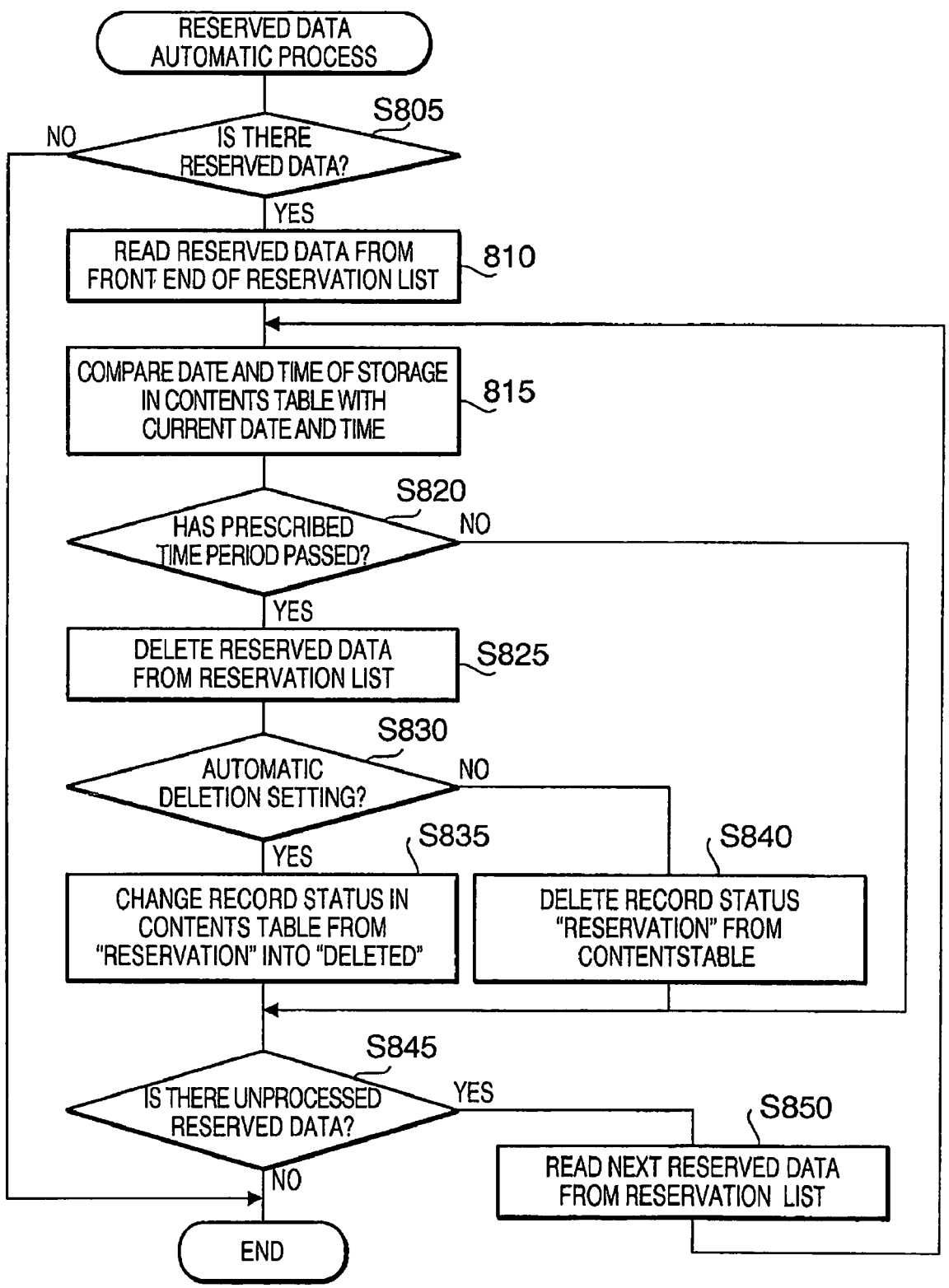
FIG. 6 is a flow chart showing a reserved data automatic process executed by the MFP in accordance with aspects of the present invention.

Next, a reserved data automatic process executed by the control unit 39 will be described referring to a flow chart of FIG. 6. The reserved data automatic process is started when an instruction designating the execution of the reserved data automatic process is issued by the user by operating the operation unit 35 of the MFP 11 or a personal computer connected to the MFP 11, or at prescribed time intervals (e.g. 1 hour).

The control unit 39 starting the reserved data automatic process first checks whether or not there exists reserved data in the reservation list of the data storage unit 31 (S805). If there exists reserved data in the reservation list (S805: YES), the process advances to step S810. If the reservation list contains no reserved data (S805: NO), the reserved data automatic process is ended.

In the step S810 (reached when reserved data exists in the reservation list), a piece of reserved data at the front end is read out from the reservation list, and the process advances to step S815.

In the step S815, the date/time 51c of the contents table is referred to based on the reserved data read out from the reservation list, and the date and time stored in the date/time 51c field of the contents table is compared with the current date and time. Subsequently, the process is branched depending on the result of the comparison (S820). If a prescribed time period (three days, one week, etc.) has passed since the date and time stored in the date/time 51c field (S820: YES), the process advances to step S825, otherwise (S820: NO) the process advances to step S845.

In the step S825 (reached when a prescribed time period has passed), the reserved data read out from the reservation list is deleted from the reservation list, and the process advances to step S830.

In the step S830, the setting information stored in the setting storage unit 33 is referred to, and the process is branched depending on whether a setting for automatically deleting reserved data has been made or not. If the setting for automatically deleting reserved data has been made (S830: YES), the process advances to step S835, otherwise (S830: NO) the process advances to step S840.

In the step S835 (reached when the setting for automatically deleting reserved data has been made), the information stored in the record status 51b of a record of the contents table corresponding to the reserved data read out from the reservation list is changed from information indicating "reservation" into information indicating "deleted". Thereafter, the process advances to the step S845.

In the step S840 (reached when the setting for automatically deleting reserved data has not been made), the information stored in the record status 51b of a record of the contents table corresponding to the reserved data read out from the reservation list (indicating "reservation") is deleted so as to let the record indicate a normal storage status (so as to let the data (formerly stored as reserved data) be stored as normal storage information). Thereafter, the process advances to the step S845.

In the step S845, the process is branched depending on whether the reservation list still contains unprocessed reserved data or not. If unprocessed reserved data exists in the reservation list (S845: YES), the process advances to step S850. If the reservation list contains no unprocessed reserved data (S845: NO), the reserved data automatic process is ended.

In the step S850 (reached when the reservation list contains unprocessed data), the next reserved data is read out from the reservation list and the process is returned to the step S815.

By the MFP 11 of this embodiment which has been described above, the user is allowed to judge whether to store the input data in the MFP 11 or not by checking the result of output of the input data (print output, scanned image, etc.), before instructing the MFP 11 to store the input data. Therefore, the problem with conventional MFPs (storage of input data in an undesired state (not desired or intended by the user) in the data storage unit 31 to be disclosed) can be eliminated. Further, the user is relieved of the task of checking already-stored data and executing the deleting operation afterward.

When the user can not decide whether to store the input data in the MFP 11 or not, the input data can be stored as reserved data and the user can select afterward whether to store the data normally or to delete the reserved data, by which high usability of the MFP 11 is realized.

Since each piece of reserved data in the reservation list is automatically processed (deleted or stored normally) when a prescribed time period has passed, the reserved data is prevented from being held untouched in the data storage unit 31 and left undisclosed for a long time (by being forgotten by the user, etc.).

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

What is claimed is:

1. An information storage device having a storage function for storing image information inputted thereto and outputting the stored image information afterward, comprising:
    an input unit configured to input image information to the information storage device;
    an output unit configured to output inputted image information inputted by the input unit;
    a storage unit;
    a storage inquiry unit configured to output an inquiry concerning whether or not to let the storage unit store the inputted image information which is being outputted by the output unit;
    a storage inquiry result reception unit configured to receive an instruction from a user in response to the inquiry outputted by the storage inquiry unit; and
    a storage control unit, which controls the output unit to output the inputted image information, controls the storage inquiry unit to execute the inquiry, and controls the storage unit to store the inputted image information outputted by the output unit if the instruction received by the storage inquiry result reception unit designates storage of the inputted image information in the storage unit, while preventing the storage unit from storing the inputted image information outputted by the output unit if the instruction does not designate the storage of the inputted image information in the storage unit,
    wherein the storage inquired by the storage inquiry unit includes normal storage and reservation storage, and
    the storage control unit controls the storage unit to store the inputted image information outputted by the output unit as normal storage information if the instruction received by the storage inquiry result reception unit designates the normal storage, while controlling the storage unit to store the inputted image information outputted by the output unit as reservation storage information if the instruction designates the reservation storage,
    wherein the normal storage information is information that is available to be disclosed, and wherein the reservation storage information is information that is not available to be disclosed.

2. The information storage device according to claim 1, further comprising:
    a change/deletion inquiry unit, which outputs an inquiry concerning whether to change specific information stored in the storage unit as the reservation storage information into the normal storage information or to delete the inputted image information from the storage unit; and
    a change/deletion inquiry result reception unit, which receives an instruction from the user in response to the inquiry outputted by the change/deletion inquiry unit,
    wherein the storage control unit changes the specific information stored in the storage unit as the reservation storage information into the normal storage information if the instruction received by the change/deletion inquiry result reception unit designates the change, while deleting the specific information from the storage unit if the instruction designates the deletion.

3. The information storage device according to claim 2, further comprising:
    a reservation storage information output unit configured to output a list of information regarding the inputted image information stored in the storage unit as the reservation storage information.

4. The information storage device according to claim 1, wherein the storage control unit changes the inputted image information stored in the storage unit as the reservation storage information into the normal storage information or deletes the inputted image information from the storage unit according to a previously made setting when a prescribed time period has passed since the storage of the inputted image information in the storage unit as the reservation storage information.

5. The information storage device according to claim 2, wherein the storage control unit changes the inputted image information stored in the storage unit as the reservation storage information into the normal storage information or deletes the inputted image information from the storage unit according to a previously made setting when a prescribed time period has passed since the storage of the inputted image information in the storage unit as the reservation storage information.

6. The information storage device according to claim 1, further comprising:
    a prior inquiry unit configured to output an inquiry concerning whether or not to let the storage inquiry unit execute the inquiry when the inputted image information is inputted by the input unit; and
    a prior inquiry result reception unit configured to receive an instruction from the user in response to the inquiry outputted by the prior inquiry unit,
    wherein the storage control unit controls the storage inquiry unit execute the inquiry and carries out the subsequent process only if the instruction received by the prior inquiry result reception unit designates the execution of the inquiry.

7. The information storage device according to claim 1, further comprising:
    a prior inquiry unit, which outputs an inquiry concerning whether or not to let the storage inquiry unit execute the inquiry when the inputted image information is inputted by the input unit; and
    a prior inquiry result reception unit configured to receive an instruction from the user in response to the inquiry outputted by the prior inquiry unit, wherein:
    the storage control unit controls the storage inquiry unit execute the inquiry and carries out the subsequent process if the instruction received by the prior inquiry result reception unit designates the execution of the inquiry, and the storage control unit controls the storage unit store the inputted image information outputted by the output unit without letting the storage inquiry unit execute the inquiry if the instruction received by the prior inquiry result reception unit does not designate the execution of the inquiry.

8. The information storage device according to claim 1, wherein the information storage device comprises:
two or more units functioning as the input unit or two or more units functioning as the output unit.

9. The information storage device according to claim 1, wherein the output unit prints the inputted image information on a print medium.

10. The information storage device according to claim 1, wherein the output unit displays the inputted image information on a display screen.

11. The information storage device according to claim 1, wherein the inputted image information is image data.

12. The information storage device according to claim 1, further comprising:
a communication unit configured to connect to a communication network to execute communication via the communication network; and
a transmission control unit, configured to transmit the inputted image information stored in the storage unit to a terminal on the communication network via the communication unit when a request from the terminal is received via the communication unit.

13. An information storage method comprising the steps of:
inputting image information to an information storage device;
outputting the inputted image information;
inquiring of a user whether or not to store the inputted image information which is being output; and
storing the inputted image information in a storage unit if an instruction for the storage of the inputted image information is received from the user, while canceling the storage of the inputted image information in the storage unit if an instruction against the storage of the image information is received from the user,
wherein the storage inquired by the storage inquiry unit includes normal storage and reservation storage, and
wherein the image inputted information is stored in the storage unit as normal storage information if an instruction from the user in response to the inquiry designates the normal storage, while the inputted image information outputted by the output unit is stored as reservation storage information if the instruction designates the reservation storage,
wherein the normal storage information is information that is available to be disclosed, and wherein the reservation storage information is information that is not available to be disclosed.

14. The information storage method according to claim 13, further comprising the step of inquiring of the user whether to change specific information stored in the storage unit as the reservation storage information into the normal storage information or to delete the inputted image information from the storage unit,
wherein the specific information stored in the storage unit as the reservation storage information is changed into the normal storage information if an instruction designating the change is received from the user, while the specific information is deleted from the storage unit if an instruction designating the deletion is received from the user.

15. The information storage method according to claim 13, wherein the inputted image information stored in the storage unit as the reservation storage information is changed into the normal storage information or deleted from the storage unit according to a previously made setting when a prescribed time period has passed since the storage of the inputted image information in the storage unit as the reservation storage information.

16. The information storage method according to claim 13, further comprising the step of inquiring of the user whether or not to execute the inquiry concerning whether or not to store the inputted image information when the information is inputted,
wherein the inquiry is executed and the subsequent step is carried out only when an instruction designating the execution of the inquiry is received from the user.

17. The information storage method according to claim 13, further comprising the step of inquiring of the user whether or not to execute the inquiry concerning whether or not to store the inputted image information in a storage unit when the information is inputted, wherein:
the inquiry is executed and the subsequent step is carried out if an instruction designating the execution of the inquiry is received from the user, and
the inputted image information is stored in the storage unit without executing the inquiry if an instruction not designating the execution of the inquiry is received from the user.

18. The information storage method according to claim 13, further comprising the step of transmitting the inputted image information stored in the storage unit to a terminal on a communication network when a request from the terminal is received.

* * * * *